Dec. 4, 1962    J. MERCIER    3,066,700
RESILIENTLY CONTROLLED VALVE
Filed Dec. 16, 1958    2 Sheets-Sheet 1

INVENTOR.
JEAN MERCIER
BY
Dean, Fairbank & Hirsch
ATTORNEYS.

Dec. 4, 1962    J. MERCIER    3,066,700
RESILIENTLY CONTROLLED VALVE
Filed Dec. 16, 1958    2 Sheets-Sheet 2

INVENTOR.
JEAN MERCIER
BY
Dean, Fairbank & Hirsch
ATTORNEYS

United States Patent Office 3,066,700
Patented Dec. 4, 1962

3,066,700
RESILIENTLY CONTROLLED VALVE
Jean Mercier, 1185 Park Ave., New York, N.Y.
Filed Dec. 16, 1958, Ser. No. 780,733
5 Claims. (Cl. 138—30)

As conducive to an understanding of the invention it is noted that where the movement of a valve head away from its seat is limited by an axially guided stem secured at one end to the valve head and having a lateral projection at its other end which abuts against a rigidly mounted stop, rapid flow of fluid which forces the valve head off its seat will cause violent impact of the projection against the stop which, after repeated operations, may cause shearing of the projection from the valve stem or breakage of the stop or the stem with resultant failure of the valve. In addition, the abrasion due to the rubbing of the stem against its guide may also cause breakdown of the valve. Furthermore, with the stem slidably mounted in a guide, the presence of particles between the stem and the guide, as may occur where the valve is used in a surge damper for a mud pump, may cause jamming of the valve.

Upon rapid flow of fluid through the valve into or out of a bladder type pressure vessel, such as a pressure accumulator, violent lateral vibration of the bladder may occur and where the axially guided valve head is secured to the bladder, shearing of the valve stem may occur or the junction between the bladder and the valve head may break, with resultant failure of the unit.

It is accordingly among the objects of the invention to provide a poppet type valve which will dependably seat to prevent flow of fluid in one direction and which, upon flow of fluid in the opposite direction, will open with the movement of the valve away from its seat limited, yet without violent impact which might cause breakdown of the valve and with out possibility of jamming which would prevent movement of the valve head, or abrasion of the valve stem and without likelihood of injury to the valve with lateral vibration of the bladder in cases where the latter is secured to the valve head.

Figure 2:
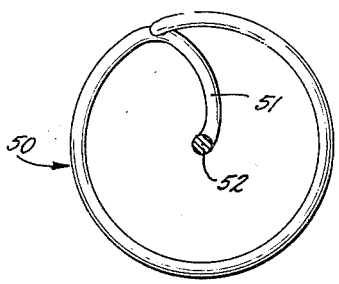
Figures 3, 4:
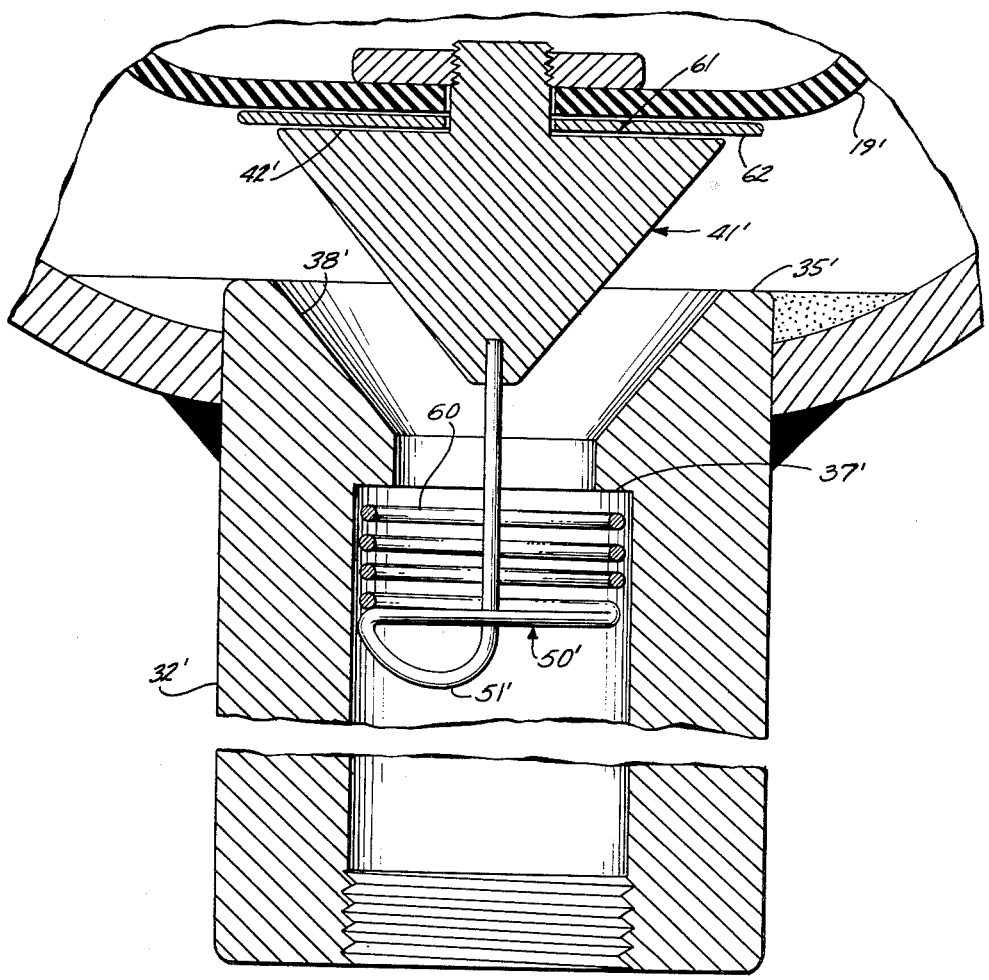

According to the invention, these objects are accomplished by the arrangement and combination of elements hereinafter described and particularly recited in the claims. In the accompanying drawings in which are shown one or more of various possible embodiments of the several features of the invention, FIG. 1 is a longitudinal sectional view of a pressure vessel incorporating the invention, FIG. 2 is a sectional view taken along line 2—2 of FIG. 1, FIG. 3 is a fragmentary longitudinal sectional view of another embodiment of the invention, and FIG. 4 is a view similar to FIG. 3 of still another embodiment thereof.

Figure 1:
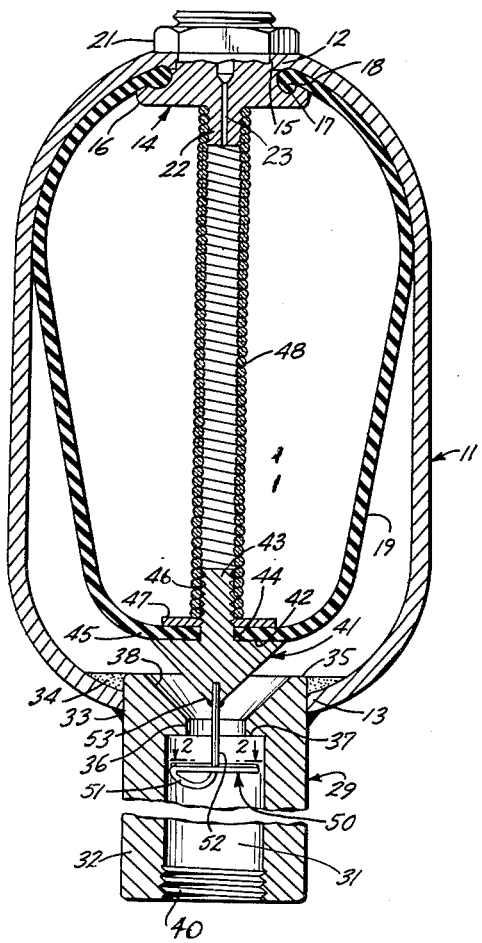

Referring now to the drawings, the pressure vessel shown in FIG. 1 which illustratively is a pressure accumulator, comprises a container 11, illustratively cylindrospherical and of strong rigid material capable of withstanding high pressure, said container having axially aligned openings 12, 13 at its opposed ends.

Mounted in opening 12 is a plug 14 having an annular shoulder 15 adapted to seat against the inner periphery of said opening. The plug 14 has a lateral flange 16 with an annular depression 17 therein to receive the thickened rim 18 of the mouth of a deformable substantially conical bladder 19 which may be of rubber or like material. Thus, when a nut 21 screwed on the threaded end of plug 14 extending beyond opening 12, is tightened, the rim 18 of the bladder will be clamped between flange 16 and the wall of the container around opening 12 securely to hold the rim in place, the shoulder 15 preventing excessive pinching of such rim.

The plug 14 desirably has an axial nipple 22 on its inner surface and a passageway 23 extends through said plug and said nipple so that gas under pressure may be forced through said passageway into said bladder to charge the latter, a suitable valve (not shown) being provided to control the passageway.

Mounted in opening 13 of the container 11 is a closure assembly 29 defining a port 31 through which a fluid under pressure, such as oil, may flow into and out of the container 11.

The closure assembly illustratively comprises a tubular member or sleeve 32 of diameter such that it may readily fit into opening 13. Although the tubular member 32 may be retained in position in opening 13 in any suitable manner, it desirably is welded in place as at 33. Preferably a filler 34 which may be of resilient material, ecompasses the portion of the tubular member 32 extending into the container and is flush with the inner end 35 of said tubular member 32.

The bore of tubular member 32 which defines the port 31 is of reduced diameter as at 36 adjacent its inner end defining an annular shoulder 37 and said bore 31 is internally threaded at its outer end 40 to receive the correspondingly threaded end of a coupling (not shown) to which a hydraulic line may be connected.

The portion of the bore between the reduced diameter portion 36 and the inner end 35 of the tubular member 32 is flared as at 38 to define a seat, to receive a substantially conical valve head 41 to control flow of fluid through said bore 31 into and out of the container 11. The base 42 of the valve head 41 is substantially flat and a stem 43 extends axially therefrom through an opening 44 in the end 45 of the bladder 19 opposed to the mouth thereof. The stem 43 is threaded at its inner end as at 46 to receive a nut 47 which, when tightened, will securely clamp the valve head 41 to the bladder 19.

Resilient means are provided normally to retain the valve head in open position. Such means, as shown in FIG. 1, desirably comprises a coil spring 48 extending centrally through bladder 19 and affixed at its respective ends to nipple 22 and to stem 43. Under normal conditions with the accumulator uncharged the spring 48 will retain the valve head 41 in open position with respect to its seat 38.

To limit the inward movement of the valve head 41 and to guide the latter with respect to the valve seat 38, a coil spring 50 is provided of diameter but slightly less than that of the bore 31 so that it may move axially thereof, the periphery of said spring 50 being adapted to abut against the shoulder 37.

One end of the spring is conformed into a loop 51 preferably lying in a plane substantially parallel to the axis of the tubular member 32 with the free end of the loop defining a stem 52 that extends axially of the convolutions of the spring and is secured to the apex 53 of the conical valve head.

In the operation of the accumulator the bladder may first be charged with gas under pressure through passageway 23 which is then sealed by a suitable valve (not shown). The charging of the bladder will cause expansion thereof which will overcome the tension of coil spring 48. As the valve head will be guided by the coil spring which is connected thereto by stem 52 it will dependably move onto its seat 38 to close the port 31.

A fluid such as oil under pressure greater than that of the gas in bladder 19 is then forced through port 31. The sudden surge of oil through port 31 will quickly move the valve head 41 off its seat into the container so that such oil may enter the latter to deform the bladder further to compress the gas therein.

The inward movement of the valve head is limited by the abutment of the periphery of the coil spring 50 against shoulder 37. However, by reason of the connection of the stem 52 of the coil spring to the valve head and the loop 51 at the root end of the stem, the stoppage of the inward movement of the valve head will be relatively gradual and hence without shock, for the loop portion of the spring will yield to absorb the shock when the periphery thereof abuts against shoulder 37.

After the bladder and container are charged with gas and oil under pressure, the deformed bladder will be retained in the center of the container by the coil spring 48 and by the axially positioned stem 52 of coil spring 50 so that the bladder will not rub against the wall of such container with resultant rupture and will not form sharp folds which are also likely to cause rupture of the bladder.

When a valve (not shown) controlling port 31 is opened, the compressed gas in bladder 19 will cause the latter to expand forcing oil out of the container through said port.

With continued expansion of the bladder, sufficient force will be exerted to overcome the tension of coil spring 48 so that the valve head 41 will move downwardly guided by the coil spring 50, to move onto its seat 38 to seal port 31, thereby stopping flow from the container and precluding extrusion of the bladder.

By reason of the filler 34 encompassing the protruding inner end of the tubular member, an uninterrupted surface will be presented for the lower end 45 of the bladder to prevent any extreme bends in such lower end which might cause breakdown thereof.

The embodiment shown in FIG. 3 is substantially identical to that shown in FIG. 1 and corresponding elements have the same reference numerals primed.

In this embodiment the central spring 48 of FIG. 1 is eliminated and a flexible plate 61 is positioned between the flat top surface 42' of the valve head 41' and the adjacent surface of the bladder 19'. The diameter of plate 61 is such that when the valve head 41' moves onto its seat 38', the periphery 62 of plate 61 will seat against the inner end 35' of the tubular member 32'.

In the embodiment shown in FIG. 3 the coil spring 50' has a plurality of unstressed convolutions, the uppermost convolution 60 of which, when the bladder is in inflated but not distended condition, is spaced from the annular shoulder 37'. Thus, where the flow of fluid through the valve into the container is very great, so that the loop 51' itself cannot take up the impact, the unstressed convolutions of the spring when stressed will serve as an added safeguard.

The provision of plate 61 is important, since the bladder upon distension thereof in operation of the accumulator and movement of the valve head 41' onto its seat 38', if it engages the inner end 35' of tubular member 32' may not provide an effective seal with respect thereto, or in some cases it may not even engage such inner end 35'.

As a result, the oil cushion that generally is present adjacent the outlet port of the accumulator may leak past the valve head 41' which is especially true where the accumulator is used in a horizontal position. However, by reason of the plate 61 the periphery of which is retained against end 35' of tubular member 32' by the pressure differential between the interior and exterior of the accumulator, a dependable seal will be provided without need for lapping of the adjacent surfaces of seat 38' and valve head 41'.

In the embodiment shown in FIG. 4 the lower end of the container 11" has a cylindrical extension 71 which defines a port 31", the inner end of said extension being curved as at 72. The extension 71 is desirably externally threaded as at 73 to receive the correspondingly threaded end of a tubular member 32", the latter being internally threaded at its outer end as at 40" and having an annular groove 74 between its ends to receive a snap ring 75 for example, which defines a stop. In the embodiment shown in FIG. 4, the bladder 19" is not secured to the substantially conical valve head 41", the periphery of which is curved as at 76 to conform to the curvature of the inner end 72 of the extension 71 which defines a seat for the valve head 41".

The valve head 41", which may have a flexible plate 61' secured thereto, which performs as previously described, is retained in open position by a coil spring 77 which illustratively has a plurality of convolutions and has its lower end resting on the snap ring 75. The inner end of the coil spring is conformed into a loop 51" lying in a plane substantially parallel to the axis of tubular member 32" with the free end of the loop defining a stem 52" that extends axially of the convolutions of the spring and is secured to the apex of the valve head 41".

Upon expansion of the bladder 19" when charged with gas under pressure, it will react against the valve head 41" to move the latter against its seat 72 against the tension of the coil spring 77, the valve head being axially guided by said coil spring 77. When oil under pressure is forced into the tubular member 32", the valve head 41" will be quickly moved off its seat 72 into the container, so that such oil may enter the latter to deform the bladder further to compress the gas therein.

The inward movement of the valve head 41" is limited by the abutment of the periphery of the coil spring 77 against the end 73 of the extension 71. However, as in the case of the embodiments previously described, by reason of the connection of the stem 52" of the coil spring 77 to the valve head 41" and the loop 51" at the root end of the stem, the stoppage of the inward movement of the valve head will be without violent impact.

With the constructions above described, since the shock normally imparted to the valve upon its opening movement is substantially eliminated, the valve may operate repeatedly without likelihood of breakdown. As the guiding action for the valve head resulting from the sliding mount of the coil spring in the tubular member is with a minimum of friction, long life of the unit is assured.

Where the valve is used with abrasive material such as is the case of a surge damper for a mud pump, for example, the elements may be coated with an abrasive resistant plastic, elastomer or the like.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A valve assembly comprising a valve seat, a valve head on one side of said seat adapted to move into sealing engagement with the latter, a stop on the other side of said seat, a coil spring on said other side of said seat mounted for movement toward and away from said stop, said spring having a stem extending axially of the convolutions thereof and rigidly secured to said valve head, said stop being in the path of movement of a portion of said coil spring, said valve head being spaced from said seat when said portion of the coil spring engages said stop to permit the movement of the valve head away from the seat, said coil spring being conformed to yield sufficiently to permit substantial movement of the valve head away from the valve seat after said portion of the coil spring engages said stop.

2. The combination set forth in claim 1 in which the coil spring has a plurality of convolutions and a second stop is provided axially spaced from said first stop, the spring being movable between said two stops.

3. A valve assembly comprising a valve seat, a valve head on one side of said seat adapted to move into sealing engagement with the latter, a stop on the other side of said seat, a stem secured at one end to said valve head and extending through said valve seat and beyond said stop, resilient means secured to the other end of said stem, said stop being in the path of movement of a portion of said resilient means, said valve head being spaced from said seat when said portion of said resilient means engages said stop to limit the movement of said valve head away from the seat, said resilient means being conformed to yield sufficiently to permit substantial movement of said valve head away from the valve seat after said portion of said resilient means engages said stop.

4. A pressure vessel comprising a container having a deformable bladder therein, said bladder having a port at one end, means securely clamping said port with respect to said container, said container having an opening axially aligned with said bladder, said opening defining a valve seat, a valve head secured to the bladder in said container on one side of said valve seat adapted to move into sealing engagement with the latter, means secured to said valve head, said means having a resilient portion on the other side of said valve seat, a stop on said other side of the valve seat in the path of movement of said resilient portion to limit the inward movement of said valve head, said valve head being spaced from said seat when said resilient portion engages said stop, said resilient portion being conformed to yield sufficiently to permit substantial movement of said valve head away from the valve seat after said resilient portion engages said stop, and means coacting with said resilient portion to control lateral movement of said valve head.

5. The combination set forth in claim 4 in which said valve head is secured to the end of the bladder remote from the port therein, a coil spring is positioned in said container and extends axially thereof, one end of said spring being fixed with respect to said container and the other end fixed with respect to said valve head, said coil spring normally retaining said valve head spaced from said seat.

References Cited in the file of this patent

UNITED STATES PATENTS

| | | |
|---|---|---|
| 507,901 | Grist | Oct. 31, 1893 |
| 898,659 | Kuehl | Sept. 15, 1908 |
| 1,896,729 | Jakubec | Feb. 7, 1933 |
| 1,945,872 | Tappe | Feb. 6, 1934 |
| 2,131,928 | Abegg | Oct. 4, 1938 |
| 2,630,834 | Weber | Mar. 10, 1953 |
| 2,801,067 | Mercier | July 30, 1957 |
| 2,932,322 | Mercier | Apr. 12, 1960 |
| 2,947,326 | Mercier | Aug. 2, 1960 |

FOREIGN PATENTS

| | | |
|---|---|---|
| 522,261 | Great Britain | June 13, 1940 |